United States Patent [19]
Earl et al.

[11] Patent Number: 6,112,228
[45] Date of Patent: Aug. 29, 2000

[54] CLIENT INHERITED FUNCTIONALLY DERIVED FROM A PROXY TOPOLOGY WHERE EACH PROXY IS INDEPENDENTLY CONFIGURED

[75] Inventors: Douglas G. Earl; Cory R. Newey, both of Orem, Utah

[73] Assignee: Novell, Inc., Orem, Utah

[21] Appl. No.: 09/023,895

[22] Filed: Feb. 13, 1998

[51] Int. Cl.[7] ............................ G06F 13/38; G06F 15/17
[52] U.S. Cl. ...................... 709/205; 709/234; 709/204; 709/203; 709/232; 709/229; 709/219; 714/46; 710/9; 710/10
[58] Field of Search .................................... 709/227, 230, 709/225, 229, 265, 204

[56] References Cited

U.S. PATENT DOCUMENTS

| | | | |
|---|---|---|---|
| 5,642,511 | 6/1997 | Chow et al. | 395/701 |
| 5,784,566 | 7/1998 | Vivan et al. | 709/229 |
| 5,924,116 | 7/1999 | Aggarwal et al. | 711/122 |
| 5,961,593 | 10/1999 | Gabber et al. | 709/219 |
| 5,964,891 | 1/2000 | Caswell et al. | 714/31 |
| 6,018,619 | 1/2000 | Allard et al. | 709/224 |

OTHER PUBLICATIONS

W3C Jigsaw, "Setting up Jigsaw as a Proxy", http://www12.w3.org/Jigsaw/Doc/User/proxy.html, Apr. 1998, pp. 1–5.

Sun Microsystems, Inc., "Java Servlet API", http://java.sun.com/products/servlet/index.html, Copyright 1995–1998, pp. 1 and 2.

Sun Microsystems, Inc., "Java Server", http://www.java soft.com/marketing/enterprise/javaserver/html, Copyright 1995–1998, pp. 1 and 2.

*Primary Examiner*—Zarni Maung
*Assistant Examiner*—Mahmanzar Moezzi

[57] ABSTRACT

A system and method efficiently provides services offered by proxy servers to client computers coupled to a network. The system comprises a proxy server interface configured to expose the services within a web brower executing on a client computer. The services available to the client are dependent upon the topology of the network coupling the client to the proxy servers and the access rights of the client with respect to the services. The invention further provides an efficient method that allows clients to inherit functionality from the proxy servers as a function of the network topology and access rights.

13 Claims, 6 Drawing Sheets

6,112,228

CLIENT INHERITED FUNCTIONALLY DERIVED FROM A PROXY TOPOLOGY WHERE EACH PROXY IS INDEPENDENTLY CONFIGURED

BACKGROUND OF THE INVENTION

It is increasingly common for users having computers interconnected by an institutional intranet or local area network to gain access to various remote sites (such as those on the "World-Wide Web") via the well-known Internet communications network. Using resident web browser applications executing on the computers, these "clients" may navigate among data ("pages") stored on various servers ("web sites") and may further view the contents of these pages as desired. In a basic network communication arrangement, clients are free to access any remote web site for which uniform resource locator (URL) addresses are available.

It is also increasingly common in network applications to provide each client with a so-called proxy server that links to the Internet. A proxy server accesses frequently requested data from the web sites and stores it locally to effectively speed-up access and reduce the download time of future requests for the data. In response to a request from a browser executing on a client, the proxy server attempts to fulfill that request from its local storage; if it cannot, the proxy server forwards the request over the Internet to a server that can satisfy the request. The server then responds by transferring a stream of data to the proxy server, which stores and forwards the data onto the client.

Each proxy server may be configured by a network administrator to provide certain functions or services to clients coupled to the network. Some of these services may be available to the general "public" of clients and others may require access rights on behalf of the clients. For example, one proxy server may be configured to offer bookmark and remote control services, whereas another proxy server may provide annotation and lesson services. The remote control and lesson services may not be available to the general public, but are only available to clients that have access rights to those specific services. Each client coupled to a proxy server may utilize the generally-available services provided by that server but only those clients that are authenticated to the network as having access rights may exploit the specifically-available services.

For an administrator desiring to offer various services to a client, the arrangement described above may be awkward and cumbersome to implement. The present invention is directed to a technique for efficiently limiting or increasing the services available to a client by way of proxy servers.

SUMMARY OF THE INVENTION

The present invention relates to a system and method for efficiently providing services offered by proxy servers to client computers coupled to a network. The system comprises a proxy server (PS) interface configured to expose the services within a web browser executing on a client computer. The services available to the client are dependent upon the topology of the network coupling the client to the proxy servers and the access rights of the client with respect to the services. The invention further provides an efficient method that allows clients to inherit functionality from the proxy servers as a function of the network topology and access rights.

In accordance with an aspect of the present invention, the PS interface provides a user of the client access to certain services available from other proxy servers on the network and efficiently displays those services on a computer screen via graphical objects within a specialized frame of a graphical user interface window. In response to a data request from the browser, the proxy server directly connected to the client inserts the PS interface into the requested stream of data provided to the browser. The user may then select the services by "pointing" at the objects in the specialized window frame with a pointer that is controlled by a hand-operated pointing device.

According to another aspect of the invention, two lists of services pertaining to access rights of the client with respect to the services available on the network are generated and maintained by the proxy servers: a default function list and an authenticated function list. The default function list contains those services that do not require authentication by the client to the network, whereas the authenticated function list includes services that require authentication on behalf of the client along with all services that do not require authentication. The default and authenticated functions are essentially inherited by the client from multiple proxy servers, as described herein.

In yet another aspect of the invention, the services provided to a client may be limited or increased by connecting the client to a particular proxy server within the network topology. The proxy servers are preferably interconnected via a proxy chain within a plexus topology of the network. Functionality defined by the function lists of each proxy server in the chain are passed downstream to the proxy server directly connected to the client and are inherited by that client; in other words, all of these inherited services may be available to the client depending upon the client's access rights. For example, the functions provided by the default function lists of proxy servers are passed down the proxy chain and inherited by the proxy server directly-connected to the client. All of these unauthenticated functions are made available to the client via the PS interface. Similarly, the functions provided by the authenticated function lists of proxy servers are passed down the proxy chain and inherited by the directly-connected proxy server; these latter services, however, are available only to those clients that are authenticated to the network. Thus, the quantity and selection of services provided to a client may be altered by manipulating the topology of proxy servers coupled to the network.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
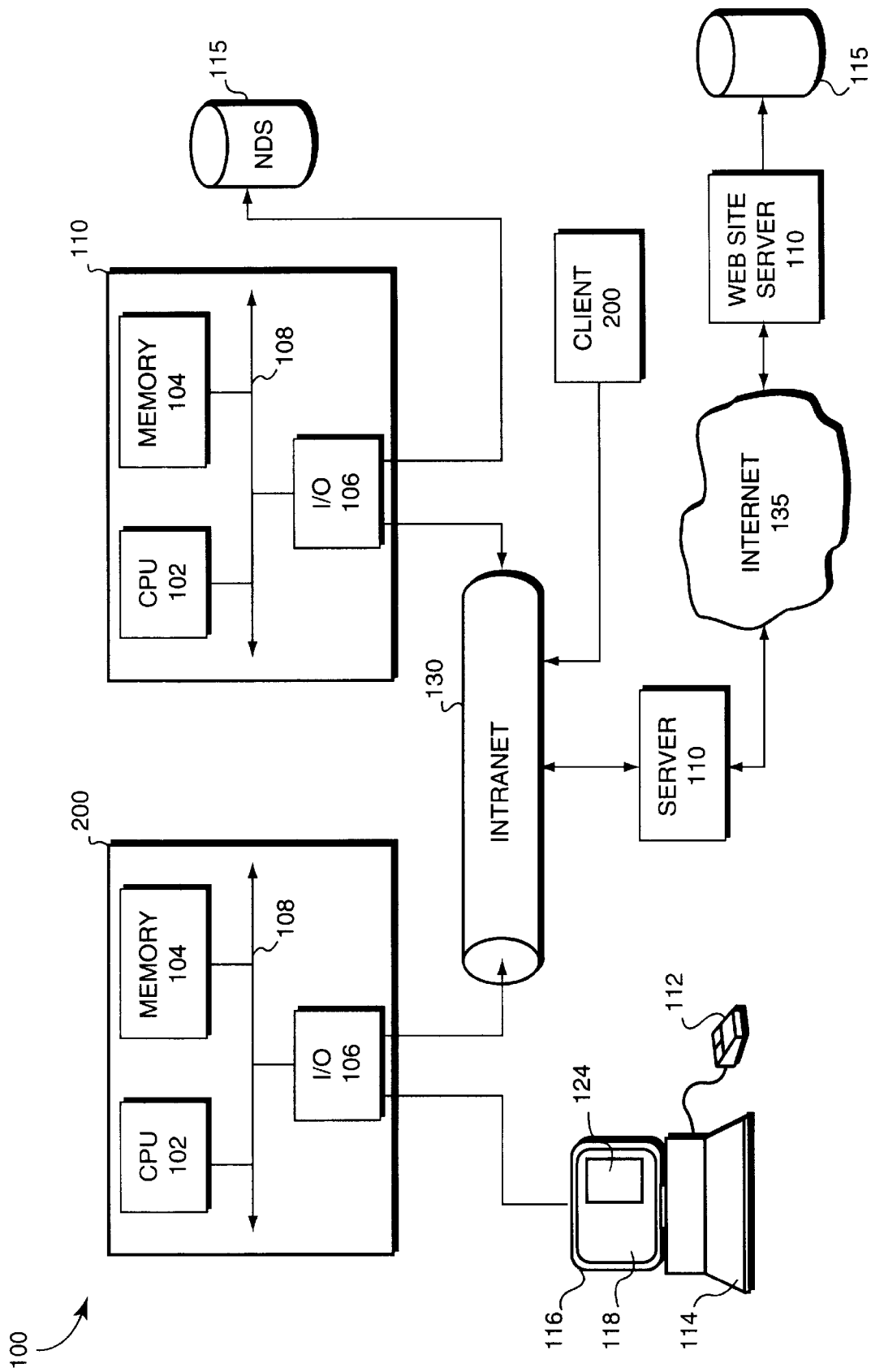
FIG. 1 is a block diagram of a network including a collection of network segments connected to a plurality of client and server computers.

FIG. 1 is a schematic block diagram of a network 100 comprising a collection of network segments connected to a plurality of computers 110, 200. Each computer typically comprises a central processing unit (CPU) 102, a memory unit 104 and an input/output (I/O) unit 106 interconnected by a system bus 108. The memory unit 104 may comprise storage locations typically composed of random access memory (RAM) devices, which are addressable by the CPU 102 and I/O unit 106. An operating system, portions of which are typically resident in memory and executed by CPU, functionally organizes the computer by, inter alia, invoking network operations in support of application programs executing on the CPU. An example of such an application program is a web browser, such as Netscape Navigator™ available from Netscape Communications, Inc.

The I/O unit 106 connects the computer to the network segments and to a mass storage device 115 or a conventional display monitor 116. The display monitor 116 includes a display screen 118 and cursor control devices, such as a mouse 112 and keyboard 114. As described herein the mass storage device, such as a disk, may function as a database for storing information relating to, e.g., users of the network. Typically, the I/O unit 106 receives information, such as control and data signals, from the mouse or keyboard and provides that information to the CPU 102 for storage/retrieval of information from the database, for display on the screen 118 or for transfer over the network segments.

The network segments may comprise a local area network or intranet 130 and the Internet 135. Collectively, the segments may be configured to form a plexus topology of internetworked computers that communicate by exchanging data packets according to a predefined set of protocols. Communication among the computers is preferably effected by reliable socket communication over Transmission Control Protocol/Internet Protocol (TCP/IP) sessions/exchanges, i.e., IP-based reliable packet delivery to a socket of a computer using TCP. It should be noted that other techniques/protocols, such as Internet Packet Exchange (IPX) protocol, may be advantageously used with the present invention.

In the illustrative embodiment, the network 100 is organized in accordance with a client/server architecture wherein computers 200 may comprise personal computers or workstations configured as "clients" for interaction with users and computers 110 are configured as "servers" that perform services as directed by the clients. For example, the server 110 may be configured as a web site server or as a Novell Directory Services (NDS) server. Notwithstanding the configuration, the disk 115 coupled to the server is configured as a database for storing and distributing information relating to, e.g., pages of specific information (web site) or client user names (NDS). In the case of the NDS server, each client polls the server (using proprietary system calls) for its unique NDS user name. The NDS name is used for further communication by the client once it is received over the intranet 130.

Figure 2:
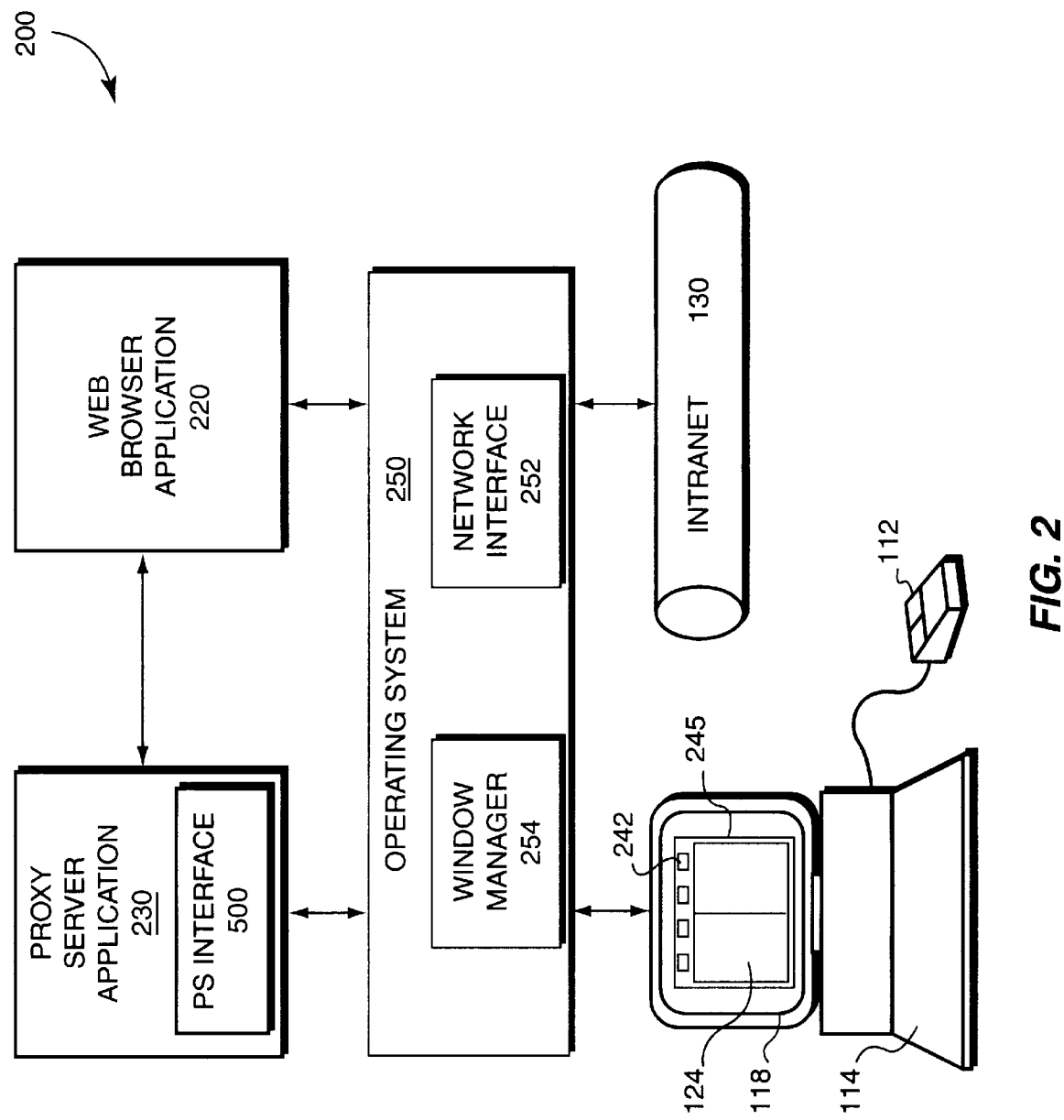
FIG. 2 is a highly schematized diagram of software components of the client computer of FIG. 1.

A client 200 may use the web browser to gain access to web site server 110 and to navigate, view or retrieve the data contents of pages stored on the server. The pages are typically hypertext documents created using a conventional hypertext markup language (HTML) format. In order to effectively speed-up access to the web site server and reduce the retrieval time for data stored on the server, each client may be provided with a proxy server. FIG. 2 is a highly schematized diagram of software components of the client computer 200. These components generally include an operating system 250 which interacts with various application program components to provide high-level functionality, including a direct interface with the user. The application program components include a web browser application 220 and the proxy server application 230.

Functionally, the proxy server 230 receives a data request from the browser 220 and, if the client is authorized to access information from the particular web site, the proxy server attempts to fulfill that request locally, e.g., from data stored in memory 104 configured as a "cache". If it cannot satisfy the request, the proxy server forwards the request over the network to the appropriate web server 110. The server then responds by transferring a stream of data to the proxy server, which stores and forwards the data onto the browser application 220. It should be noted that the proxy server may also be configured to run on a server computer 120.

The operating system software includes ultility programs such as a network inter face 252 that provides the client with access to the network 100 and a window manager 254. The window manager is a system software routine that is generally responsible for managing windows that the user views during operation of an application program component. That is, it is generally the task of the window manager to keep track of the locations and sizes of the windows and window areas which must be drawn and redrawn in connection with such application execution.

Broadly stated, the application programs make use of the functions of the utility programs by issuing a series of task commands to the operating system which then performs the requested task. For example, an application program may request that the network interface 252 initiate transfer of information over the intranet 130 or that the window manager 254 display certain information on a window of the screen 118 for presentation to the user. Further to this latter example, the client 200 also comprises the web browser application component 220 which, in connection with the window manager 254, provides a graphical user interface for displaying the web site information on windows 124 of the display screen 118. Specifically, the web browser and window manger operate to display a browser window environment with iconic (pictorial) representations, multifont typographic-style text and other art work on the screen to facilitate entering and viewing of information by the user.

The invention herein features, along with these windows, the provision of an additional user interface to the proxy server which, when invoked, cause actions to take place that enhance the ability of a user to interact with the network. In accordance with one aspect of the present invention, the proxy server (PS) interface 500 provides a user access to certain services available from other proxy servers on the network and efficiently displays those services via graphical objects 242, such as buttons, within a specialized frame 245 of the windows 124. In response to a data request from the browser to an HTML page, the proxy server 230 inserts the PS interface 500 into the requested stream of data provided to the browser. The user may then select the services displayed within the PS interface by "pointing" at the objects 242 in the specialized window frame 245 with a pointer that is controlled by a hand-operated pointing device, such as mouse 112, or by pressing keys of keyboard 114.

Figure 3:
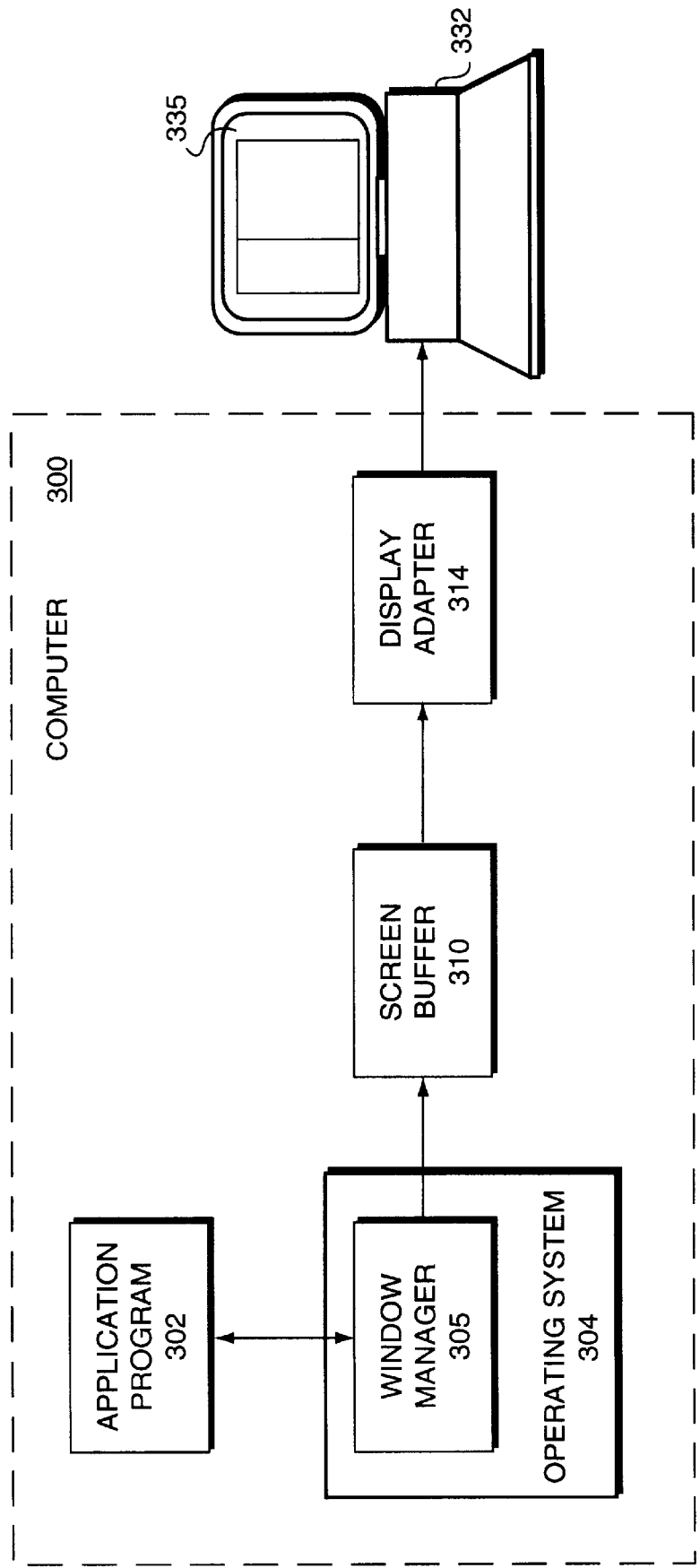
FIG. 3 is a schematic diagram illustrating the interaction of an application program and an operating system of a computer, which is similar to the client computer of FIG. 1.

This new behavior is brought about by the interaction of the PS interface software with a series of system software routines associated with the operating system. These system routines, in turn, interact with the application program components to create the specialized windows, as described herein. FIG. 3 is a schematic illustration of the interaction of an application program 302 and an operating system 304 of a computer 300, which is similar to, and has equivalent elements of, the client 200. The application program 302 and the operating system 304 interact to control and coordinate the operations of the computer 300. In order to display information on a screen display 335, application program 302 generates and sends display commands to a window manager 305 of the operating system 304. The window manager program 305 stores information directly into a screen buffer 310. Under control of various hardware and software in the system, the contents of the screen buffer 310 are read out of the buffer and provided to a display adapter 314. The display adapter contains hardware and software (sometimes in the form of firmware) which converts the information in the screen buffer 310 to a form which can be used to drive a display screen 335 of a monitor 332.

In the illustrative embodiment, the inventive PS interface 500 is preferably implemented via a Java applet, which is a program that is executed while a user views Internet information, such as World-Wide Web pages. Java applets are linked or included in these pages in a manner similar to images or other data with hard-coded references to an Internet uniform resource locator (URL) address. When a user selects a highlighted or underlined portion of a web page that is linked to a Java applet, the applet is transferred across the Internet 135 to the user's web browser 220 where it is executed. If the browser contains a Java interpreter, the Java applet (comprising Java byte codes) is loaded and executed by a Java Virtual Machine (JVM) embedded within the web browser. Java applets, interpreters and the JVM are well-known, and many articles and texts are available which describe these programs and tools in detail.

As noted, the PS interface 500 is displayed on screen 118 as part of the data stream content of a page returned to the browser. Instead of returning the page immediately upon receipt of the data stream from the Internet, the proxy server saves the page (i.e., original document) and responds to the browser request with a first document that references the original document as well as with a second document that contains a reference to the Java applet representing the PS interface. The browser then initiates loading of the Java applet and original document saved by the proxy server.

Figure 4:
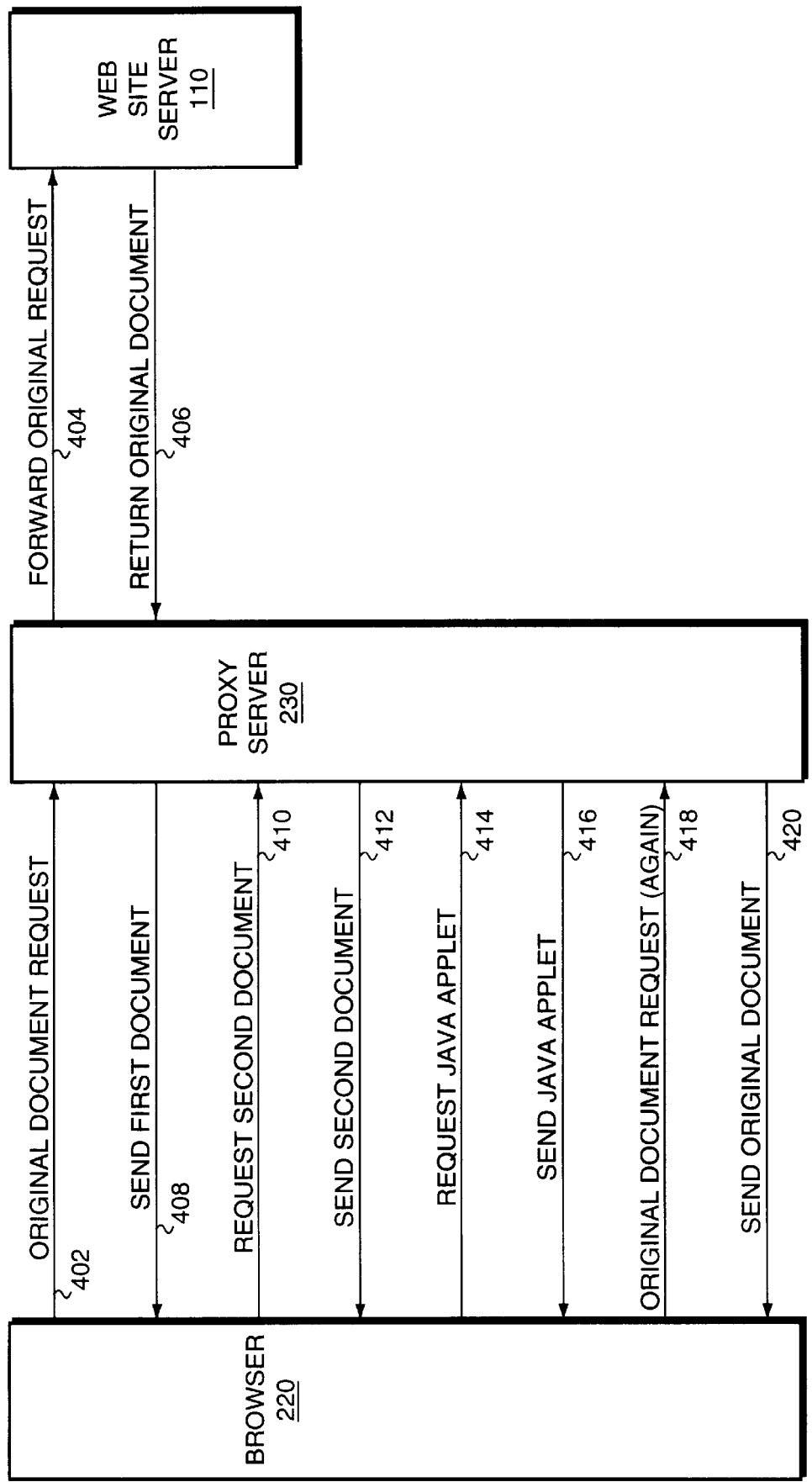
FIG. 4. is a schematic diagram illustrating the use of conventional hypertext transfer protocol flows to insert a novel proxy server (PS) interface into requested data stream content in accordance with the invention.

FIG. 4. is a schematic diagram illustrating the use of conventional hypertext transfer protocol (HTTP) flows among the browser 220, proxy server 230 and web site server 110 to insert the PS interface into the data stream content provided to the browser. HTTP is a client-server TCP/IP protocol used on the World-Wide Web for the exchange of HTML documents. In flow 402, the browser requests the original HTML document at a particular URL and, at flow 404, the proxy server forwards the request over the Internet to the web site server. At flow 406, the proxy server 230 receives the original document from the server 110 and stores ("caches") a copy of that document. Using the conventional HTML frames feature, the proxy server creates the first HTML document that references the saved document and the second HTML document that references the Java applet that displays the buttons.

Figure 5:
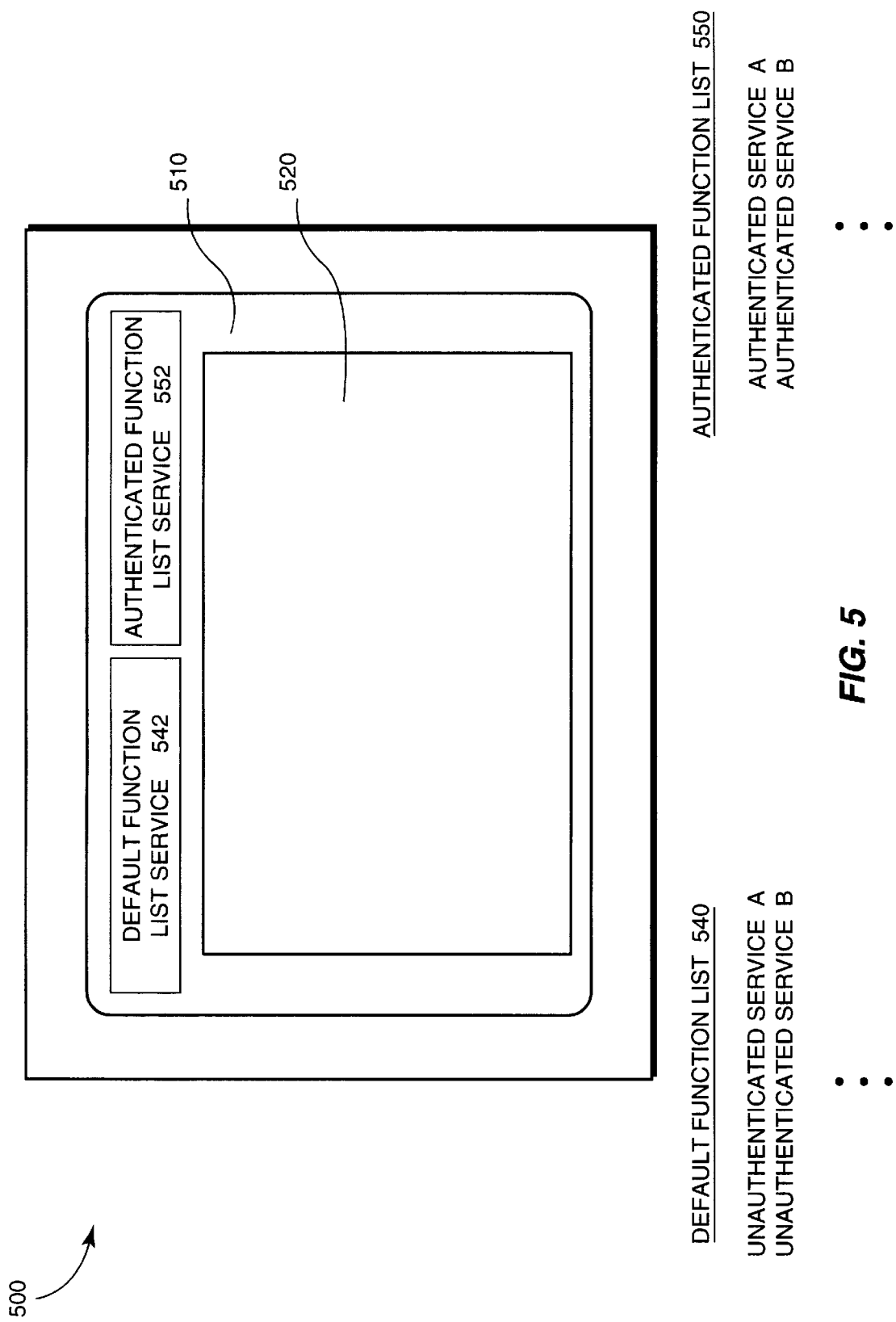
FIG. 5 is a schematic diagram of the PS interface configured to manifest services of a default function list and an authenticated function list according to the present invention.

At flow 408, the proxy server sends the first document to the browser and, at flow 410, the browser requests the second HTML document referencing the Java applet. The proxy returns the second document at flow 412. Note that references to the buttons contained in the Java applet are passed as parameters to the applet in accordance with a conventional parameter passing mechanism. Note also the representations of the function lists (described further herein) are also passed as parameters to the applet. In flow 414, the browser requests the Java applet, which is promptly returned by the proxy server at flow 416. The browser then requests (again) the original document at flow 418. In response, the proxy server retrieves the cached copy of the document and, at flow 420, forwards it to the browser According to another aspect of the invention, two lists of services are generated and maintained by proxy server 230, and displayed by PS interface 500: a default function list and an authenticated function list. FIG. 5 is a schematic diagram of a PS interface 500 displayed within a browser window of a computer screen and configured to manifest the services of default function list 540 and authenticated function list 550 via buttons 542, 552 within a specialized window frame 510 containing the Java applet. Note that frame 520 contains the original document requested by the browser. In the illustrative embodiment, each button 542, 552 represents a specific service accessible to a user. The services are grouped within these lists according to access rights of the client with respect to the services available on the network.

Specifically, the default function list 540 contains a list of those services that do not require authentication by the client to the network and are thus available to the general "public" of client users. The authenticated function list 550, on the other hand, includes services that require authentication (access rights) on behalf of the client in addition to all services that do not require authentication. A network administrator generally configures each proxy server to provide such services, typically as conventional "built-in" functions that are native to the proxy server or as "snap-in" functions that are added to the proxy server functionality by a conventional external dynamic linking mechanism. When the proxy server application "boots", it creates its default and authenticated function lists.

For example, one proxy server may be configured to offer bookmark and remote control services, whereas another proxy server may provide annotation and lesson services. The remote control and lesson services may not be available to the general public, but are only available to clients that have access rights to those specific services. Each client coupled to a proxy server may utilize the generally-available services provided by that server but only those clients that are authenticated to the network as having access rights may exploit the specifically-available services.

Clients typically authenticate to the network via NDS or some other conventional authentication mechanism. In the case of NDS authentication, there may be a list of user names stored on the NDS database 115 and associated with those names are access control lists (ACLs) for a particular service. A request issued to the proxy server 230 from the brower application 220 of the client generally includes a user name that is parsed by the server and forwarded to the NDS server 110. The NDS server examines the request in connection with the ACLs to determine whether the client has access rights for that request. If access is denied, the client is notified by a return of a denial packet. If access is permitted, however, the PS interface 500 is inserted into the data stream with buttons providing access to the authenticated function list of services. An example of a network authentication procedure that is suitable for use with the present invention is described in commonly-assigned U.S. patent application Ser. No. (112024-0033) titled, User Name Authentication for Gateway Clients Accessing a Proxy Cache Server by Mark L. Shapiro et al, which application is hereby incorporated by reference as though fully set forth herein.

In yet another aspect of the invention, the services accessible to a user through the PS interface 500 depend upon the topology of the internetworked computers. That is, the services provided to a client may be limited or increased by connecting the client to a particular proxy server within the network topology. The proxy servers are preferably interconnected via a proxy chain within a plexus topology of the network. Functionality defined by the function lists of each proxy server in the chain are passed downstream to the proxy server directly connected to the client and are essentially "inherited" by that client. In other words, all of these inherited services may be available to the client depending upon the client's access rights.

Figure 6:
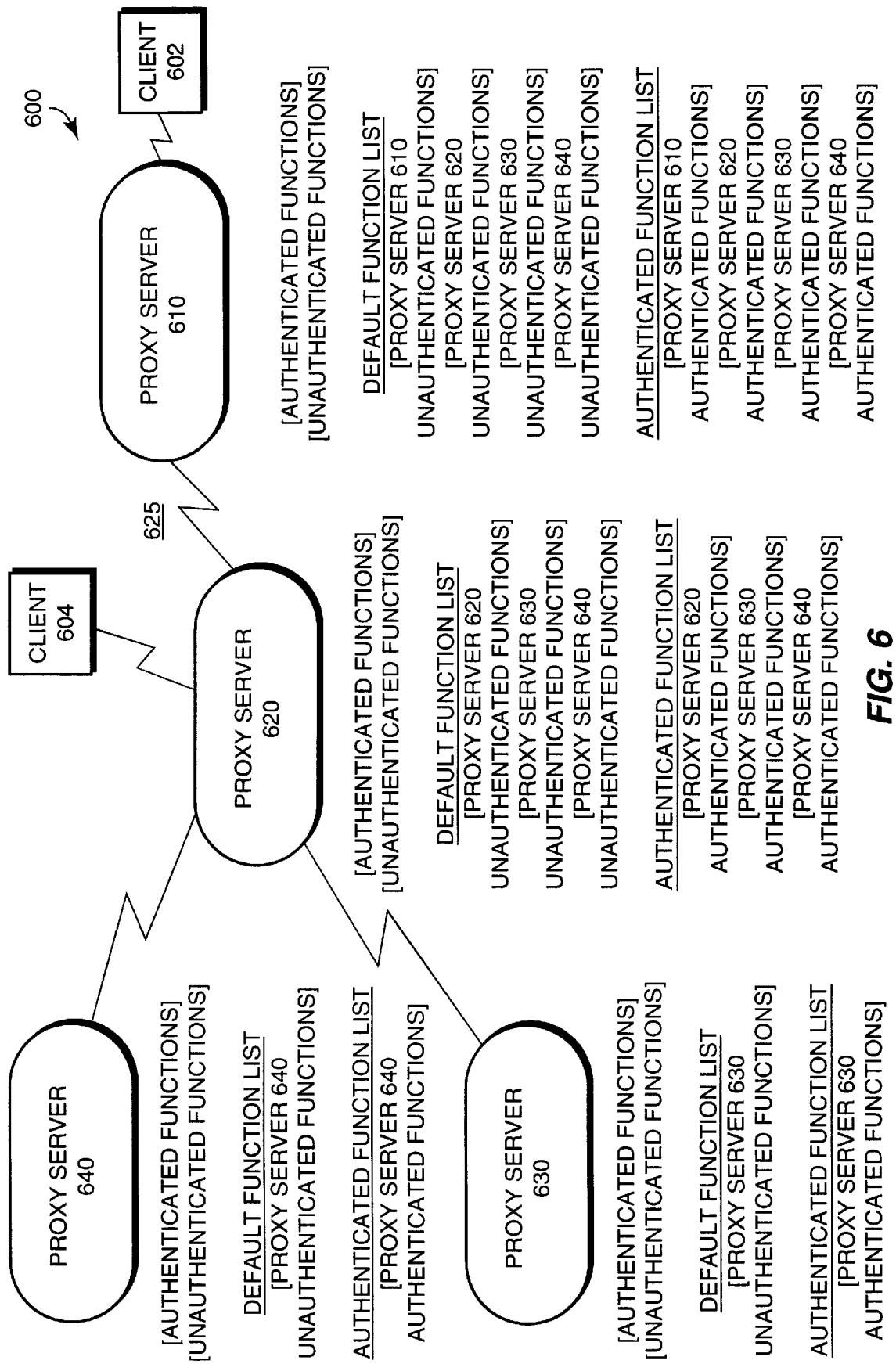
FIG. 6 is a schematic diagram of a network topology of interconnected proxy servers, each of which may be configured to provide services to a client computer using the PS interface of the present invention.

FIG. 6 is a schematic diagram of a plexus network topology 600 of interconnected proxy servers 610–640, each of which may be configured to provide services to client computers 602, 604. It should be noted that each proxy server generally resides and executes on the computer to which it is directly attached, although the proxy server could be located on another computer. Client computer 602 connects directly to proxy server 610 and client computer 604 connects directly to proxy server 620 such that client 602 connects to proxy server 620 via proxy server 610. Moreover, proxy servers 630, 640 connect to proxy server 620. According to the invention, this topological arrangement denotes that services available to client 602 from the proxy servers are propagated downstream over a proxy chain 625 to proxy server 610. Each proxy server along proxy chain 625 is capable of either inserting content into the data stream returned to the browser or providing access to a given set of functions or services known to the proxy server.

For example, assume client 602 launches a web browser application 220 and then issues a request for a document from a web page on web server 110 to be displayed on a window 124 of screen 118. Assume also that client 602 has not authenticated itself to the network. Since proxy server 610 is directly-coupled to client 602, the request is forwarded to that proxy server. Proxy server 610 then issues an inquiry packet over the network 600 to determine if it is connected upstream to another proxy server. In response to the inquiry, proxy server 620 returns a packet indicating it is connected to proxy server 610. Proxy server 620 then performs a similar procedure to determine that it is connected to proxy servers 630 and 640. In the illustrative embodiment, each proxy server is configured with an IP address and a port number to enable socket communication via a conventional polling mechanism over TCP/IP.

Since proxy server 610 is connected downstream of proxy server 620, proxy server 610 requests proxy server 620's default function list 540; similarly, proxy server 620 requests the default function lists of proxy servers 630 and 640. Note that proxy servers 630 and 640 request the default function lists of the proxy servers connected upstream from them. According to the invention, each of those default function lists are sent down the chain 625 to proxy server 610, as denoted by the entries listed below the Default Function List heading at proxy server 610. See [Proxy Server 610 Unauthenticated Functions]; [Proxy server 620 Unauthenticated Functions]; [Proxy server 630 Unauthenticated Functions]; and [Proxy server 640 Unauthenticated Functions]. Proxy server 610 thus has "knowledge" of all services it can make accessible to an unauthenticated client 602 via button 542 of PS interface 500 inside the browser window.

Assume now that client 602 has received authentication for a particular session, has notified proxy server 610 of the authentication session and has requested access to an authenticated service. In a manner similar to that described above, proxy server 610 sends a packet to proxy server 620 requesting its authenticated function list 550 and proxy server 620 requests the authentication function lists of proxy servers 630 and 640. Each of these authenticated function lists propagate down the chain 625 to proxy server 610, as denoted by the entries listed below the Authenticated Function List heading at proxy server 610. See [Proxy Server 610 Authenticated Functions]; [Proxy server 620 Authenticated Functions]; [Proxy server 630 Authenticated Functions]; and [Proxy server 640 Authenticated Functions]. Proxy server 610 then combines these authenticated function lists with the previously collected default function lists and manifests these service offerings as authenticated function list button 552 within PS interface 500 inserted into the requested stream of data provided to the client. These service offerings are available to client 602 only during the authenticated session and once the session terminates, the authenticated function list is removed.

In the illustrative embodiment described herein, proxy server 610 maintains the default and authenticated function lists for client 602, and proxy server 620 maintains default and authenticated function lists for client 604. Notably, the lists of services maintained by proxy server 610 may differ from those services maintained by proxy server 620 primarily because server 610 is directly connected to client 602 and server 620 is directly coupled to client 604. Accordingly, aspects of the present invention are that the proxy server coupled directly to the client holds the default and authenticated function lists for that client, and that the services available to the client are dependent upon the topology of the network.

Further to this latter aspect, the default and authenticated function lists of services stored at proxy server 610 are a superset of those stored at proxy server 620 because services mantained at the proxy server 620 do not include the default and authenticated services provided by proxy server 610. That is, proxy server 620 does not have access to the services provided by proxy server 610 because proxy server 610 is located down is stream of proxy server 620 within the network topology 600. As noted, the function lists maintained by proxy server 620 includes the function lists of proxy servers 630, 640 and others upstream from it. If the network administrator decided that that client 604 should have access to all of the functions available through the network topology 600, then it would couple client 604 directly to proxy server 610. Likewise if client 604 were directly coupled to proxy server 640, it would not have access to the function lists provided by proxy servers 630, 620 or 610.

In summary, the services provided by the default function list of each proxy server are passed down the proxy chain and inherited by the proxy server directly-connected to the client. All of these unauthenticated functions are made available to the client via the PS interface inserted into the requested datastream. Similarly, the functions provided by the authenticated function lists of proxy servers are passed down the proxy chain and inherited by the directly-connected proxy server; these latter services, however, are available only to those clients that are authenticated to the network. Thus, the quantity and selection of services provided to a client may be altered by manipulating the topology of proxy servers coupled to the network.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for efficiently providing services to a user of a computer from a plurality of proxy servers interconnected to form a network topology having a proxy chain, the method comprising the steps of:

configuring the topology of the network to increase the services available to the user by directly connecting the computer to a first proxy server;

passing a list of the available services from each remaining proxy server along the proxy chain to the first proxy server said list including an identified first default function list and a second separate to be authenticated function list so that the available services are selectively inherited by the first proxy server;

authenticating a specific service for a client upon user request; providing a specialized user interface of the computer using a proxy server interface of the first proxy server; and displaying the inherited services including separate said first and second lists to the user of the computer.

2. The method of claim 1 further comprising the steps of, wherein the computer is a client computer executing a browser application:

issuing a request for data at a web site from the browser application to the first proxy server;

if the client is authorized to access information from the web site, fulfilling the request at the first proxy server;

transferring a data stream from the first proxy server to the browser application.

3. The method of claim 2 wherein the step of fulfilling comprises one of the steps of:

retrieving the data locally from a memory of the client; and remotely acquiring the data from the web site.

4. The method of claim 3 wherein the step of remotely acquiring comprises the steps of:

forwarding the request over the network from the first proxy server to a web server; and transferring the data stream from the web server to the proxy server.

5. The method of claim 4, wherein the step of displaying comprises the steps of:

inserting the proxy server interface into the data stream transferred to the browser application;

displaying the proxy server interface on a display screen of the client computer, the proxy server interface including graphical objects representing the inherited services within the specialized user interface; and selecting the inherited services by one of pointing at the objects with a pointing device and pressing keys of a keyboard.

6. The method of claim 5, wherein the graphical objects are buttons and wherein the pointing device is a mouse, further including the steps of saving an original document in response to a user request, and responding to the user with a display of a graphical object which refers to the original document.

7. The method of claim 2 wherein the first proxy server executes on one of the client computer and another server computer.

8. The method of claim 2 wherein the list of the available services comprises one of a default function list containing services that do not require authentication by the client to the network and an authenticated function list containing services that require authentication on behalf of the client along with the services that do not require authentication.

9. The method of claim 8 wherein the step of passing comprises the steps of propagating the list downstream over the proxy chain to the first proxy server such that the inherited services are available to the client depending upon the client's access rights.

10. The method of claim 9 wherein the step of configuring comprises the step of manipulating the topology of the proxy servers coupled to the network to thereby alter the quantity and selection of services provided to the client.

11. Apparatus for efficiently providing services to a user of a computer from a plurality of proxy servers interconnected to form a network topology having a proxy chain, the apparatus comprising:

means for configuring the topology of the network to increase the services available to the user by directly connecting the computer to a first proxy server;

means for passing a list said list, including an identified first default function list and a second separate to be authorized function list of the available services from each remaining proxy server along the proxy chain to the first proxy server so that the available services are inherited by the first proxy server; and means for displaying the inherited services in the form of said first default function list and a second to be authorized function list within a specialized user interface of the computer using a proxy server interface of the first proxy server.

12. The apparatus of claim 11 wherein the computer is a client computer executing a browser application and wherein the first proxy server executes on one of the client computer and another server computer.

13. The apparatus of claim 12 wherein the list of the available services comprises one of a default function list containing services that do not require authentication by the client to the network and an authenticated function list containing services that require authentication on behalf of the client along with the services that do not require authentication.

* * * * *

UNITED STATES PATENT AND TRADEMARK OFFICE
CERTIFICATE OF CORRECTION

PATENT NO. : 6,112,228
DATED : August 29, 2000
INVENTOR(S) : Douglas G. Earl et al.

It is certified that error appears in the above-identified patent and that said Letters Patent is hereby corrected as shown below:

On the title page, Item [54] should read --CLIENT INHERITED FUNCTIONALITY DERIVED FROM A PROXY TOPOLOGY WHERE EACH PROXY IS INDEPENDENTLY CONFIGURED--.

Signed and Sealed this

Seventeenth Day of April, 2001

*Attest:*

NICHOLAS P. GODICI

*Attesting Officer*   Acting Director of the United States Patent and Trademark Office